United States Patent
Chang

(10) Patent No.: US 7,379,405 B2
(45) Date of Patent: May 27, 2008

(54) METHOD AND OPTICAL DISK DRIVE FOR PROMPTLY PROTECTING VOICE COIL MOTOR THEREOF FROM OVER CURRENT

(75) Inventor: Cheng-Li Chang, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 773 days.

(21) Appl. No.: 10/856,855

(22) Filed: Jun. 1, 2004

(65) Prior Publication Data

US 2005/0265148 A1 Dec. 1, 2005

(51) Int. Cl.
*G11B 7/00* (2006.01)

(52) U.S. Cl. ................... 369/53.23; 369/44.11
(58) Field of Classification Search ............. 369/44.11, 369/44.25, 53.23
See application file for complete search history.

(56) References Cited

U.S. PATENT DOCUMENTS 4,489,259 A * 12/1984 White et al. ................ 318/696
4,609,954 A * 9/1986 Bolton et al. ............ 360/78.06
4,683,560 A * 7/1987 Takeuchi et al. ......... 369/44.25
4,949,201 A * 8/1990 Abed ....................... 360/78.07
6,041,030 A * 3/2000 Ohmi ....................... 369/53.19

* cited by examiner

Primary Examiner—Gautam R. Patel
(74) Attorney, Agent, or Firm—Bacon & Thomas, PLLC

(57) ABSTRACT

The invention is disclosed a method for promptly protecting a voice coil motor in an optical disk drive. A step (A) allows a data signal processor (DSP) to execute a protect module of the voice coil motor every preset time interval. In a step (B), the DSP executes following further steps during executing the protect module. A step (b1) reads tracking error (TE)/focusing error (FE) and determines if the TE/FE is over a safety range. A step (b2) starts a gain decrease operation of a signal amplifier if the TE/FE in step (b1) has been over the safety range for more than the first preset number of times so as to lower the control current outputting to the voice coil motor. A step (b3) starts an operation of speed reduction and a low current operation of a controller to secure the voice coil motor being safe if the TE/FE in step (b1) has been over the safety range for more than a second preset number of times.

10 Claims, 4 Drawing Sheets

METHOD AND OPTICAL DISK DRIVE FOR PROMPTLY PROTECTING VOICE COIL MOTOR THEREOF FROM OVER CURRENT

FIELD OF THE INVENTION

The present invention is related to a method for protecting the voice coil motor in an optical disk drive from over current and particularly to a method and an optical disk drive for promptly protecting the voice coil motor thereof from over current.

BACKGROUND OF THE INVENTION

Control for the conventional voice coil motor in an optical disk drive is referenced with current limit information of the voice coil motor and the optical disk drive designer can assign gain value in accordance with an ideal object value with which the voice coil motor can operate safely so as to apply for designing the controller directly. The voice coil motor of this type of optical disk drive is apt to create over current and results in being burned out due to related factors such as signal correction difference, controller design difference, optical disk drive worn-out difference, environment difference and component damage because of not complying a hazard value of component signal restriction and due to the voice coil motor being abrasive wear after being used a long period of time by the user. Hence, the optical disk drive is unable to work normally.

SUMMARY OF THE INVENTION

A primary object of the present invention is to provide a method and an optical disk drive for promptly protecting the voice coil motor thereof from over current so as to avoid the voice coil motor being burned out.

Another object of the present invention is to provide a method and an optical disk drive for promptly protecting the voice coil motor thereof from over current, which is created from related factors such as signal correction difference, controller design difference, optical disk drive worn-out difference, environment difference, component damage because of not complying with a hazard value of component signal restriction.

Accordingly, a method for promptly protecting a voice coil motor in an optical disk drive from over current according to the present invention includes the following steps: (A) allowing a data signal processor (DSP) to execute a protect module of the voice coil motor every preset time interval; (B) the DSP executing following further steps during executing the protection module: (b1) reading tracking error (TE)/focusing error (FE) and determining if the TE/FE is over a safety range; (b2) starting an operation of gain decrease in a signal amplifier if the TE/FE in step (b1) has been over the safety range for more than a first preset number of times so as to lower the control current outputting the voice coil motor; and (b3) starting an operation of speed reduction and a low current operation of a controller to secure the voice coil motor being safe if the TE/FE in step (b1) has been over the safety range for more than a second preset number of times.

Further, an optical disk drive with protect mechanism for a voice coil motor being protected from over current includes a coil motor and a data signal processor (DSP), which executes a protect module of the coil motor every preset interval and the protection module offers the DSP to execute following instructions: (a) reading tracking error (TE)/focusing error (FE) and determining if the TE/FE is over a safety range; (b) starting an operation of gain decrease in a signal amplifier if the TE/FE has been over the safety range for more than a first preset number of times so as to lower the control current outputting the voice coil motor; and (c) starting an operation of speed reduction and a low current operation of a controller to secure the voice coil motor being safe if the TE/FE has been over the safety range for more than a second preset number of times.

BRIEF DESCRIPTION OF THE DRAWINGS

The present invention can be more fully understood by reference to the following description and accompanying drawings, in which.

DETAILED DESCRIPTION OF THE INVENTION

Figure 1:
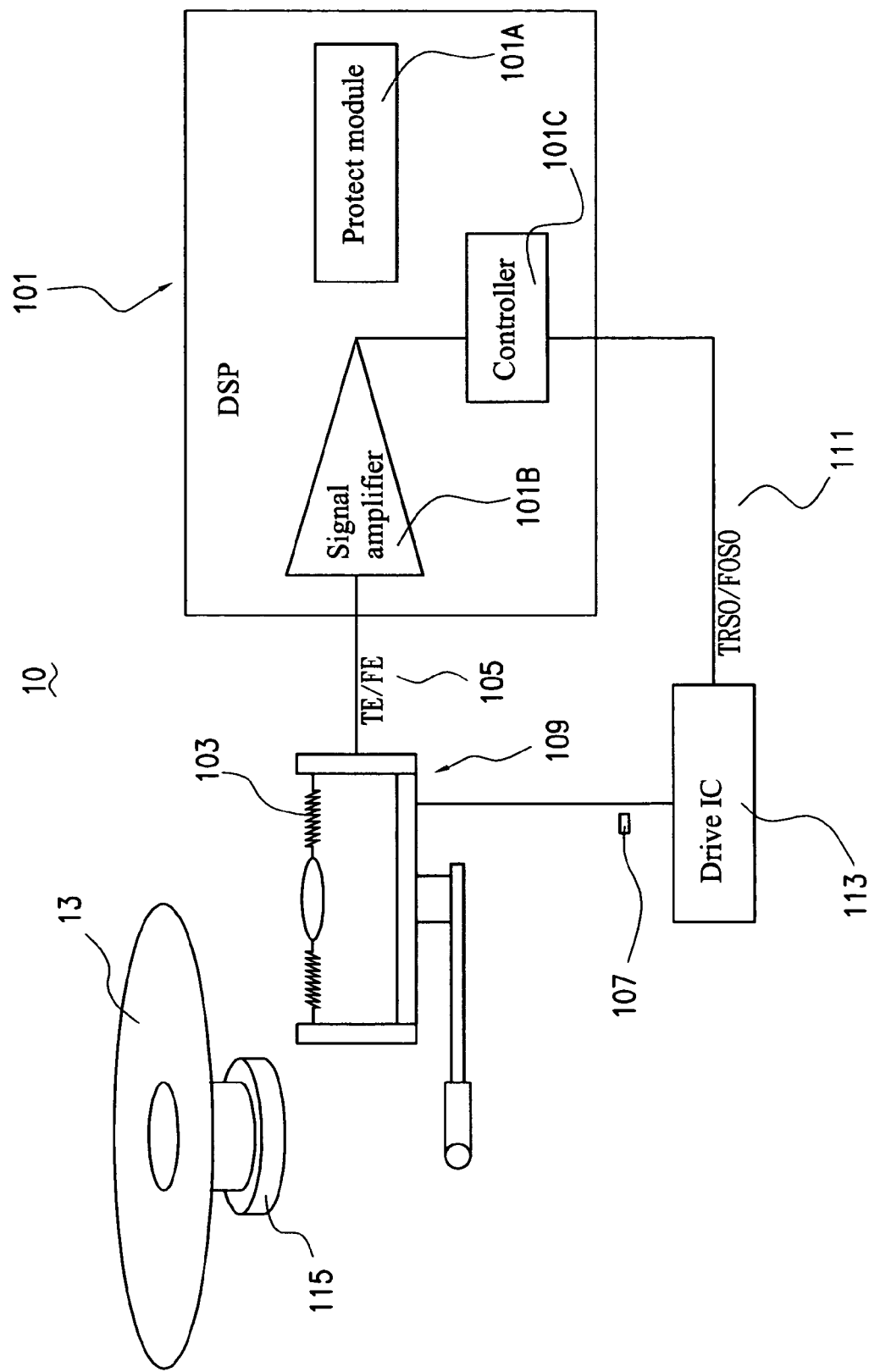
FIG. 1 is a structure diagram of the optical disk drive using the method of the present invention.
Figure 2:
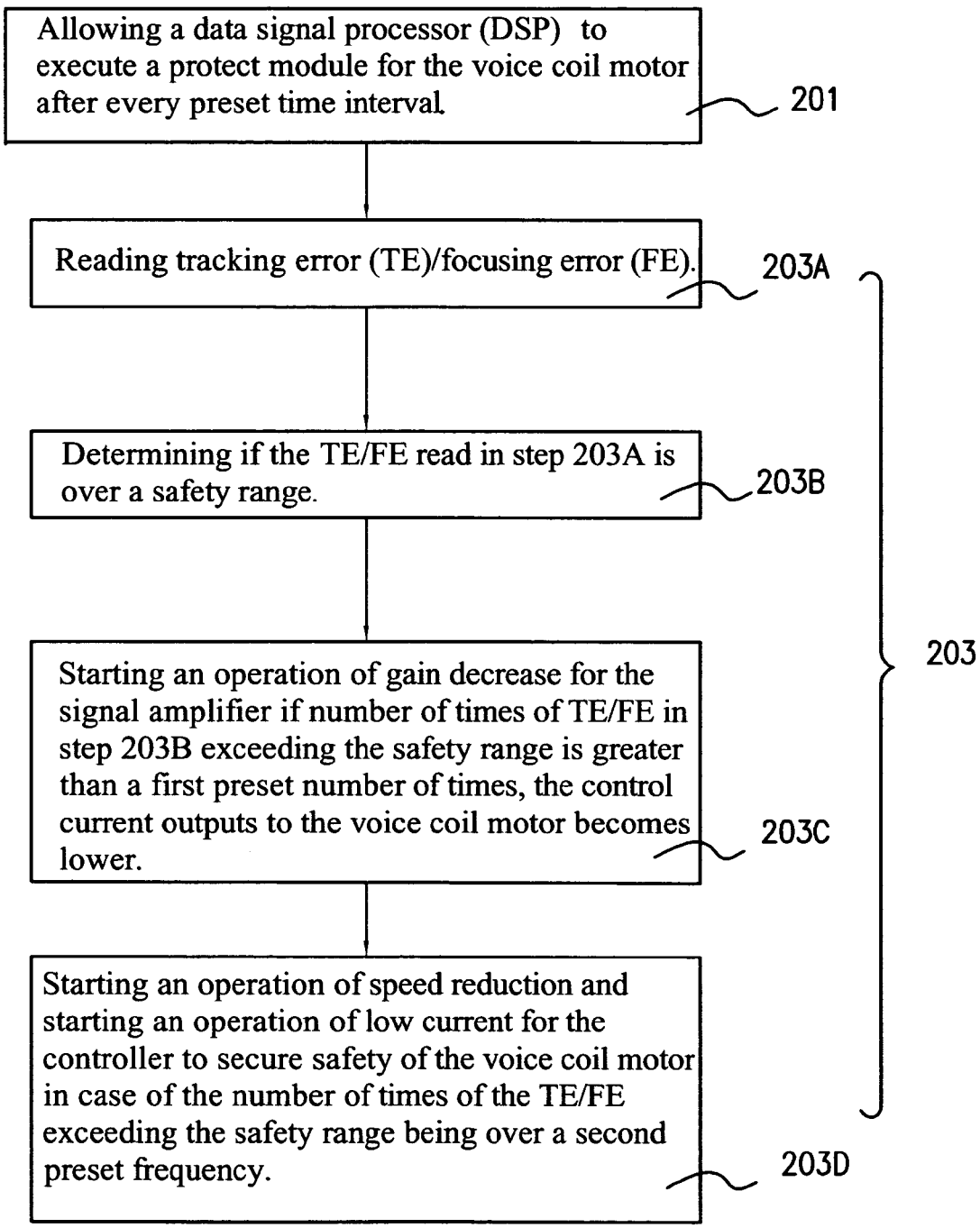
FIG. 2 is a flow chart of the method according to the present invention.

Referring to FIGS. 1 and 2, a method 20 for promptly protecting a voice coil motor in an optical disk drive from over current basically includes steps explained hereinafter. Step 201 is allowing a data signal processor (DSP) 101 to execute a protect module 101A for the voice coil motor after every preset time interval. While step 201 is in practice, a timer built in the DSP 101 or an external timer connecting with the DSP 101 can be reset a time interval such as 20 millisecond (ms) right before a trigger signal being generated. The trigger signal is used for the DSP 101 being capable of executing protect module 101A for the voice coil motor.

Step 203 is executing sub-steps 203A to 203C while the protect module 101A for the voice coil motor is executed and program codes can be adopted to implement the protect module 101A for the voice coil motor. Step 203A is reading tracking error (TE)/focusing error (FE) 105 and step 203B is determining if the TE/FE read in step 203A is over a safety range. Generally, the supplier offers an electrical specification of the voice coil motor 103 such as the average operation current of the voice coil motor 103. For example, the voice coil motor 103 is operated continuously with current 250 mA and the current 250 mA is represented as the average operation current shown in the electrical specification. It is noted that if the current passing through the voice coil motor 103 is controlled below the average operation current, the voice coil motor 103 is capable of being normally operated continuously. Hence, it is a restriction that the voice coil motor 103 is operated under a condition of the current passing through the voice coil motor being over 250 mA for a long period of time. The current greater than 250 mA is called over current. The instantaneous current such as 350 mA in 6 seconds indicated in the electrical specification means the voice coil motor 103 can normally run in 6 seconds and there is a risk for the voice coil motor 103 being burned out in case of exceeding 6 seconds. The preceding electrical specification of the voice coil motor 103 is utilized in the present invention as a basis of safety range.

Step 203C is starting an operation of gain decrease for the signal amplifier 101B if number of times of TE/FE 105 in step 203B exceeding the safety range is greater than a first preset number of times, the control current 107 outputs to the voice coil motor 103 becomes lower. The TE/FE 105 being output with the pick-up 109 is measured with DSP 101 and the DSP 101 also has read the peak voltage value and the valley voltage value of the TE/FE 105. Right at the moment, the peak voltage value and the valley voltage value of the TE/FE 105 are compared to the safety range. Taking actual voltage value of the TE/FE 105 being output with the pick-up 109 as an example, the voltage peak value and the voltage valley value measured and read by the DSP 101 are normally in a range between +1.4V and −1.4V. It is worth to be noted that the current passing through the voice coil motor in the optical disk drive without adopting the method of the present invention exceeds 250 mA while the voltage peak value and the voltage valley value of the TE/FE 105 being read is greater than +1.2V or less than −1.2V. That is, it results in a state of creating over current. In case of the control current being over current, a corresponding limit range for the TE/FE 105 can be obtained in the present invention by way of the TE/FE 105 being correlative with the control current 107. Once the DSP 101 in the present invention has determined the TE/FE 105 exceeding safety range being true, that is, the DSP 101 reads the voltage peak value and the voltage valley value being greater than +1.2V or less than −1.2V and the number of times of the TE/FE 105 exceeding safety range is over the first preset number of times such as over 5 times, the DSP 101 starts an operation of gain decrease for the signal amplifier 101B to decrease gain of the signal amplifier 101B at the front end. In this way, the voltage value of the TRSO/FOSO 111 can be changed to urge the drive IC 113 lowering the control current 107 outputting to the voice coil motor 103 so as to keep the current passing through the voice coil motor 103 in a safe operation range.

Step 203D is starting an operation of speed reduction and starting an operation of low current for the controller to secure safety of the voice coil motor 103 in case of the number of times of the TE/FE 105 exceeding the safety range being over a second preset frequency. Once the number of times of the TE/FE 105 exceeding the second preset frequency such as 25 times, The DSP 101 starts speed reduction to lower rotational speed of the spindle motor 115 so as to obtain successful execution for tracking and focusing and starts operation of low current for the controller so as to allow the controller 101C sending out the TRSO/FOSO 111 by way of low current so that drive IC 113 can lower the control current 107 sent to the voice coil motor 103 for the current passing through the voice coil motor 103 being kept in the safe operation range.

The method 20 of the present invention can be implemented with program codes in the optical disk drive 10 and the optical disk drive 10 can be with function of disk burning or without function of disk burning in practice.

Figure 3:
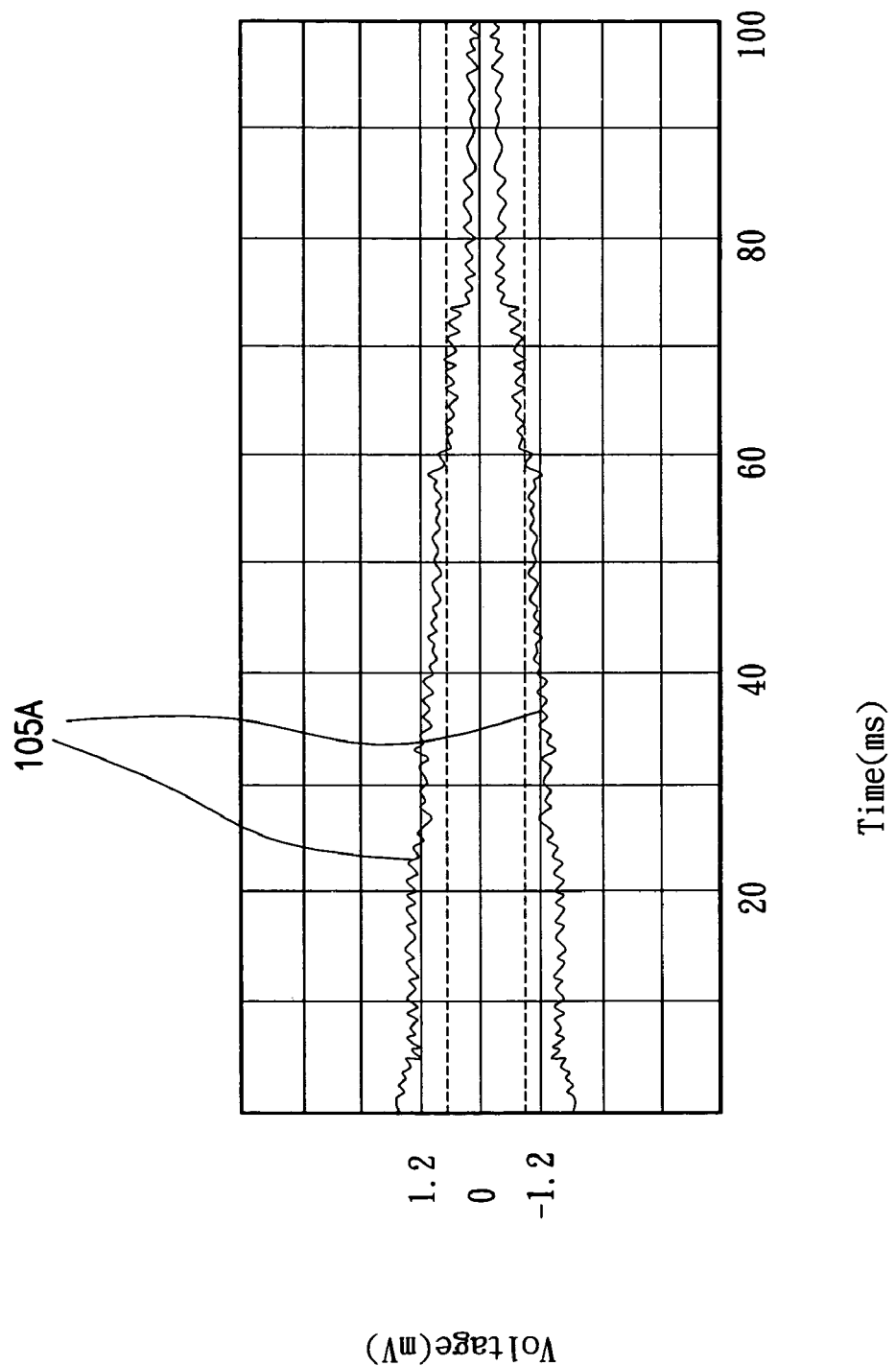
FIG. 3 is a graph showing TE signal of the optical disk drive after being controlled by the method according to the present invention.
Figure 4:
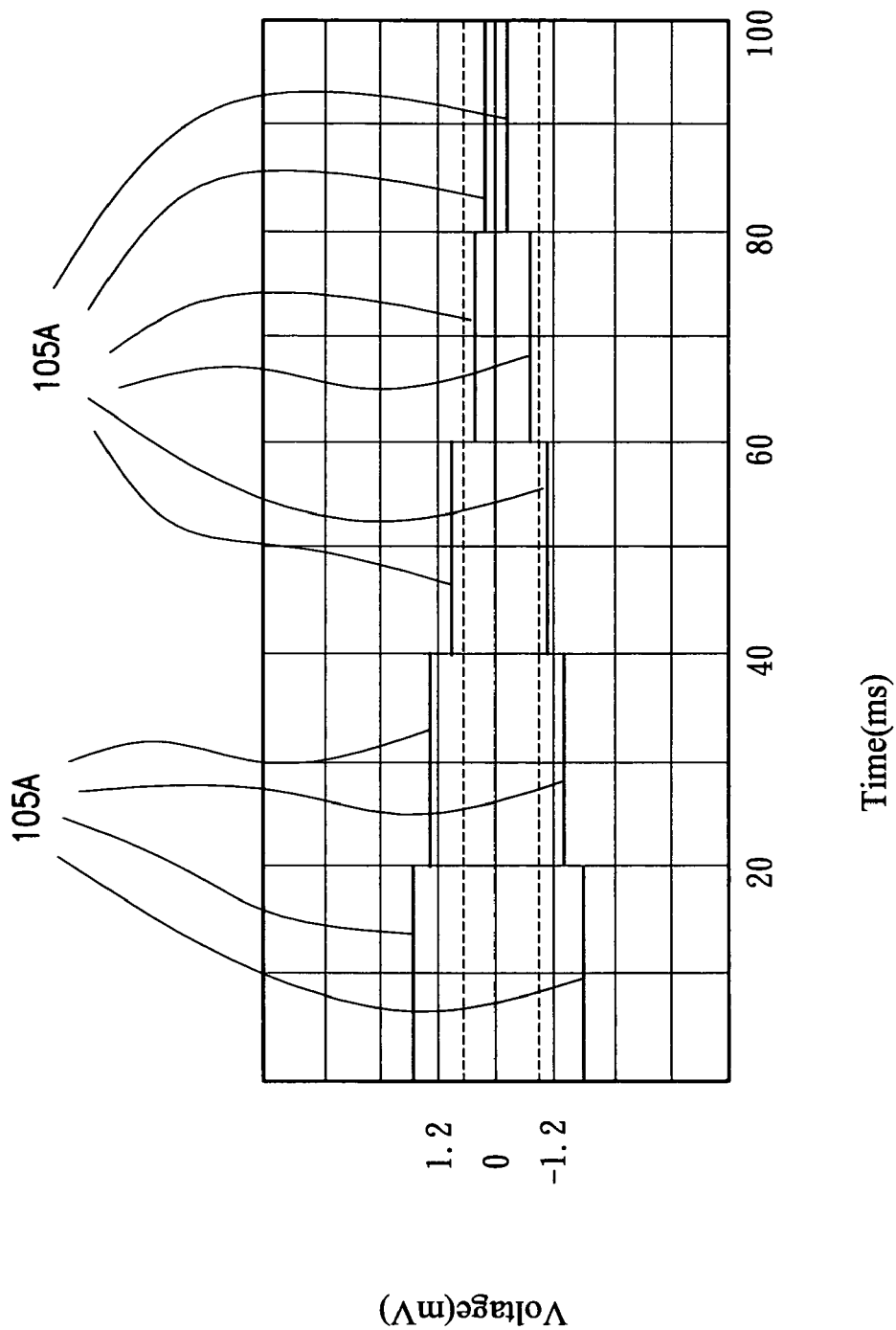
FIG. 4 is a graph showing the TE signal in an ideal state.

FIG. 3 shows that the TE 105A of the optical disk drive 10 exceeds the safety range of +1.2 mV to −1.2 mV from the beginning and then the voltage peak value and the voltage valley value stabilize gradually in the safety range of +1.2 mV and −1.2 mV after the optical disk drive 10 executing the method 20 of the present invention every interval of 20 ms. FIG. 4 shows the method of the present invention executes every 20 ms to lower the voltage peak value and the voltage valley value of the TE 105A from exceeding the safety range gradually till being in the safety range. By the same token, the method 20 of the present invention can be implemented to control the FE being stabilized in the safety range of +1.2 mV and −1.2 mV.

The method 20 and the optical disk drive 10 of the present invention provide the following advantages:

1. Although rectification for the control signal of the optical disk drive can be completed in the process of being initialized before leaving the factory, it is possible for the optical disk drive being rectified as high current output to result in over current in case of the optical disk drive being interfered during being initiated. The present invention is capable of restraining the optical disk drive from occurring over current.

2. Generally speaking, the controller 101C can find a control value with greatest common factor according to difference between different optical disk 13, but it is possible to result in generating over current once the controller 101C meets a special test optical disk due to factors of the optical drive designer being less experience and considering insufficient disk categories. The over current caused by the preceding reason can be restrained with the method of the present invention.

3. The voice coil motor may be abrasive wear due to being used a long period of time and it causes lowered resistance value and occurs the over current. Apparently, the over current resulting from the abrasive wear can be restrained to prolong the life span of the optical disk drive indirectly.

4. When the optical disk drive is carelessly designed to result in TRSO/FOSO exceeding the extent that the voice coil motor can undertake and the amplifying parameter of the controller is fixed and unable to conduct the protection job, the method of the present invention can lessen further damage of the optical disk drive promptly.

5. When the voice coil motor occurs over current due to the control signal of the optical disk drive being unable to be rectified because of ambient temperature change, the method of the present invention can lessen further damage of the optical disk drive.

While the invention has been described with reference to the preferred embodiments thereof, it is to be understood that modifications or variations may be easily made without departing from the spirit of this invention, which is defined by the appended claims.

What is claimed is:

1. A method for promptly protecting a voice coil motor in an optical disk drive from over current, comprising the following steps:

(A) allowing a data signal processor (DSP) to execute a protect module for the voice coil motor every preset time interval;

(B) the DSP executing the following further steps during execution of the protect module:

(b1) reading tracking error (TE)/focusing error (FE) and determining if TE/FE is over a safety range;

(b2) starting a gain decrease operation of a signal amplifier if TE/FE has been over the safety range for more than a first preset number of times so as to lower a control current outputting to the voice coil motor; and (b3) starting an operation of speed reduction and a low current operation of a controller to ensure that the voice coil motor is safe if TE/FE has been over the safety range for more than a second preset number of times.

2. The method as defined in claim 1, wherein the preset time interval is 20 ms.

3. The method as defined in claim 1, wherein the protect module of the coil motor is program codes.

4. The method as defined in claim 1, wherein the safety range is based on the electrical specification of the coil motor.

5. The method as defined in claim 1, wherein the first preset number of times is less than the second preset number of times.

6. An optical disk drive with protect mechanism for preventing a coil motor from creating over current, comprising:
   a voice coil motor; and
   a data signal processor (DSP) that executes a protect module for the coil motor every preset interval; wherein
   the protect module allows the DSP to execute the following instructions:
   (a) reading tracking error (TE)/focusing error (FE) and determining if TE/FE is over a safety range;
   (b) starting a gain decrease operation of a signal amplifier if TE/FE has been over the safety range for more than a first preset number of times so as to lower a control current outputting to the voice coil motor; and
   (c) starting an operation of speed reduction and a low current operation of a controller to ensure that the voice coil motor is safe if TE/FE has been over the safety range for more than a second preset number of times.

7. The method as defined in claim 6, wherein the preset time interval is 20 ms.

8. The method as defined in claim 6, wherein the protect module of the coil motor is program codes.

9. The method as defined in claim 6, wherein the safety range is based on the electrical specification of the coil motor.

10. The method as defined in claim 6, wherein the first preset number of times is less than the second preset number of times.

* * * * *